United States Patent [19]
Grado

[11] Patent Number: 4,868,792
[45] Date of Patent: Sep. 19, 1989

[54] DIFAR DEMULTIPLEXER TEST CIRCUIT

[75] Inventor: Gilbert R. Grado, Tustin, Calif.

[73] Assignee: Rockwell International Corporation, El Segundo, Calif.

[21] Appl. No.: 165,968

[22] Filed: Mar. 9, 1988

[51] Int. Cl.$^4$ .................................... H04B 17/00
[52] U.S. Cl. .................................... 367/13; 367/3; 367/118
[58] Field of Search ............... 434/6; 367/3–5, 367/13, 123–126, 118

[56] References Cited

U.S. PATENT DOCUMENTS

| | | | |
|---|---|---|---|
| 3,870,989 | 3/1975 | Mallet | 367/126 X |
| 4,017,822 | 4/1977 | Rusch | 367/126 X |
| 4,057,778 | 11/1977 | Bates et al. | 367/3 |
| 4,109,232 | 8/1978 | Bates et al. | 367/13 |
| 4,205,396 | 5/1980 | Pryor, Jr. | 367/126 |
| 4,393,483 | 7/1983 | Hammond et al. | 367/13 |

Primary Examiner—Thomas H. Tarcza
Assistant Examiner—Tod Swann
Attorney, Agent, or Firm—H. Fredrick Hamann; George A. Montanye; James F. Kirk

[57] ABSTRACT

A demultiplexer test circuit having a signal source summing means responsive to a selected target angle theta for adding a first independent noise signal to an input signal to provide a composite omni signal and for adding a second noise signal to the product of the cosine of the selected target angle and the input signal to provide a composite cosine signal, and for adding a third noise signal to the product of the sine of the selected target angle and the input signal to provide a composite sine signal. A dual output phase shifting means responsive to a selected heading angle phi provides a quad count signal, a quad count clock signal, a reference count signal and a reference count clock signal. The reference count signal is lags the quad count signal by a time interval proportional to the selected heading angle phi. A quadrature detector circuit responds to the quadrature count signal and the quadrature count clock signal to transfer the state of the quadrature count signal to a sine modulator signal in response to a quadrature count clock signal to provide the sine modulator signal; and, for transferring the state of the sine modulator signal in response to the quadrature count clock signal to provide the cosine modulator signal. The sine modulator signal leads the cosine modulator signal by ninety degrees. A phase pilot reference circuit transfers the state of the reference count signal to a phase pilot reference signal in response to a reference count clock signal to provide the a phase pilot reference signal. A cosine modulator provides a modulated cosine signal. A sine modulator is provides a modulated sine signal. A frequency division means provides a frequency pilot signal having a frequency equal to one half the frequency of the sine modulator signal. A multiple pseudo random noise source provides first, second and third independent noise signals. A sum means provides a sonobuoy composite signal representing the sum of the composite omni signal, the modulated cosine signal, the modulated sine signal, the frequency pilot signal and the reference phase pilot signal.

13 Claims, 9 Drawing Sheets

DIFAR DEMULTIPLEXER TEST CIRCUIT

BACKGROUND OF THE INVENTION

1. Field of the Invention

This invention relates to the field of sonar, and more particularly to the field of demultiplexer circuits used in demultiplexing the multiplexed signal information obtained from DIFAR sonobuoys. This invention provides a test circuit for testing a DIFAR DEMULTIPLEXER CIRCUIT.

DIFAR sonobuoys are dropped in numbers by intelligence gathering aircraft into ocean areas that are to be subjected to short term sonar monitoring. As shown in FIGS. 1, the DIFAR sonobuoys typically have a first dipole directional sonar hydrophone that respond to sound along a sonobuoy (Y) axis, a second dipole directional hydrophone that respond to sound along a sonobuoy (X) axis, and a non-directional or omni hydrophone that responds to sound with uniform sensitivity on all level radials from the instrument.

The DIFAR sonobuoy is typically characterized to float at a predetermined depth for a predetermined duration. The (X) and (Y) axes are orthogonal and are kept float level by operation of the hydrostatic design of the sonobuoy. The sonobuoy is equipped with a fluxgate compass. No means is provided to orientate the sonobuoy once it is in the water.

Sounds received by the hydrophones in the sonobuoy are multiplexed in accordance with a predetermined DIFAR format for transmission to an aircraft sent to record the received data.

The DIFAR format requires that the following conventions be adopted. Using a top view of the sonobuoy, angle Phi is measured clockwise from magnetic north to the +Y axis. Angle Theta is measured clockwise from the +Y axis to the target location. When dropped into the ocean, the angle phi can be any angle from 0 to 360 degrees. The sonobuoy orientation can continually change due to wave action. The relative amplitude and polarity of target signals from the Y axis hydrophones varies as the cosine of angle theta. The relative amplitude and polarity of target signals from the X axis hydrophones varies as the Sine of angle theta. The omni hydrophone signal is positive in all quadrants of angle theta.

The sonobuoy circuitry provides a 15.0 kilohertz signal with four (4) outputs at 90 degree phase intervals. The first signal referred to as the 15.0 kilohertz phase reference signal is phase shifted or delayed in time by an interval proportional to the magnetic heading angle phi to generate a signal referred to as the phase pilot signal.

The Y axis hydrophone information is referred to as cosine channel information. The X axis channel information is referred to as sine channel information. The cosine channel information is multiplied by a cosine modulator signal having a frequency of 15.0 kilohertz. The cosine modulator signal leads the 15.0 kilohertz phase reference by 90 degrees. All delays are measured with respect to the phase reference signal. The sine channel information is multiplied by a sine modulator signal having a frequency of 15.0 kilohertz and is phased shifted to lead the cosine modulator signal by 90 degrees.

The sonobuoy also provides a constant amplitude 7.5 Kilohertz frequency pilot signal. The frequency pilot signal is by definition exactly one half the frequency of the phase reference signal. The phase relationship between the frequency pilot signal and the phase reference signal is not defined.

The omni signal is not multiplied by a carrier. The bandpass of the omni signal information is typically under 2.5 kilohertz. An RF carrier is modulated with the sum of the frequency pilot, the phase pilot, the cosine channel, sine channel and the omni signal information and transmitted by the DIFAR sonobuoy to the sampling aircraft to be recorded on board the aircraft or for retransmittal to a receiving station as a single channel signal for demultiplexing by the DIFAR demultiplexing circuit.

2. Prior Art

Previous DIFAR demultiplexer test circuits did not provide the capability to select a variable heading angle and target angle to test all functions of the DIFAR DEMULTIPLEXER CIRCUIT. The invention DIFAR demultiplexer test circuit provides the required accuracy and flexibility to test and adjust the DIFAR demultiplexer circuit under all conditions. This application relates to an application titled DIFAR DEMULTIPLEXER CIRCUIT Ser. No. 164050, filed 03/04/88, having common inventorship and assignee.

SUMMARY OF THE INVENTION

It is an objective of this invention to provide a simplified DIFAR demultiplexer test circuit for testing and analyzing all performance features of a DIFAR DEMULTIPLEXER CIRCUIT.

The invention DIFAR demultiplexer test circuit receives a clock signal from a clock signal source responsive to a two bit compression ratio signal CR. The compression ratio signal is a logic signal provided to the test circuit to adapt the DIFAR demultiplexer test circuit to simulate signals received from a sonobuoy at four different clock rates.

The DIFAR demultiplexer test circuit has a signal source summing means responsive to a selected target angle theta for adding a first independent noise signal to an input signal to provide a composite omni signal and for adding a second noise signal to the product of the cosine of the selected target angle and the input signal to provide a composite cosine signal, and for adding a third noise signal to the product of the sine of the selected target angle and the input signal to provide a composite sine signal.

A dual output phase shifting means receives a selected heading angle phi and provides a quad count signal, a quad count clock signal, a reference count signal and a reference count clock signal. The reference count signal lags the quad count signal by a time interval proportional to the selected heading angle phi. A quadrature detector circuit responds to the quadrature count signal and the quadrature count clock signal to transfer the state of the quadrature count signal to a sine modulator signal and transfers the state of the sine modulator signal in response to the quadrature count clock signal to provide the cosine modulator signal. The sine modulator signal leads the cosine modulator signal by ninety degrees. A phase pilot reference circuit transfers the state of the reference count signal to provide a a phase pilot reference signal. A cosine modulator provides a modulated cosine signal. A sine modulator is provides a modulated sine signal. A frequency division means provides a frequency pilot signal having a frequency equal to one half the frequency of the sine modulator signal.

A multiple pseudo random noise source provides first, second and third independent noise signals. A sum means outputs a sonobuoy composite signal representing the sum of the composite omni signal, the modulated cosine signal, the modulated sine signal, the frequency pilot signal and the reference phase pilot signal.

DESCRIPTION OF THE PREFERRED EMBODIMENT

The invention demultiplexer test circuit is designed to test any DIFAR demultiplexer circuit that conforms to MIL STD AN/SSQ-53B. The invention test circuit provides a single sonobuoy composite signal to a DIFAR demultiplexer circuit under test.

Figure 1:
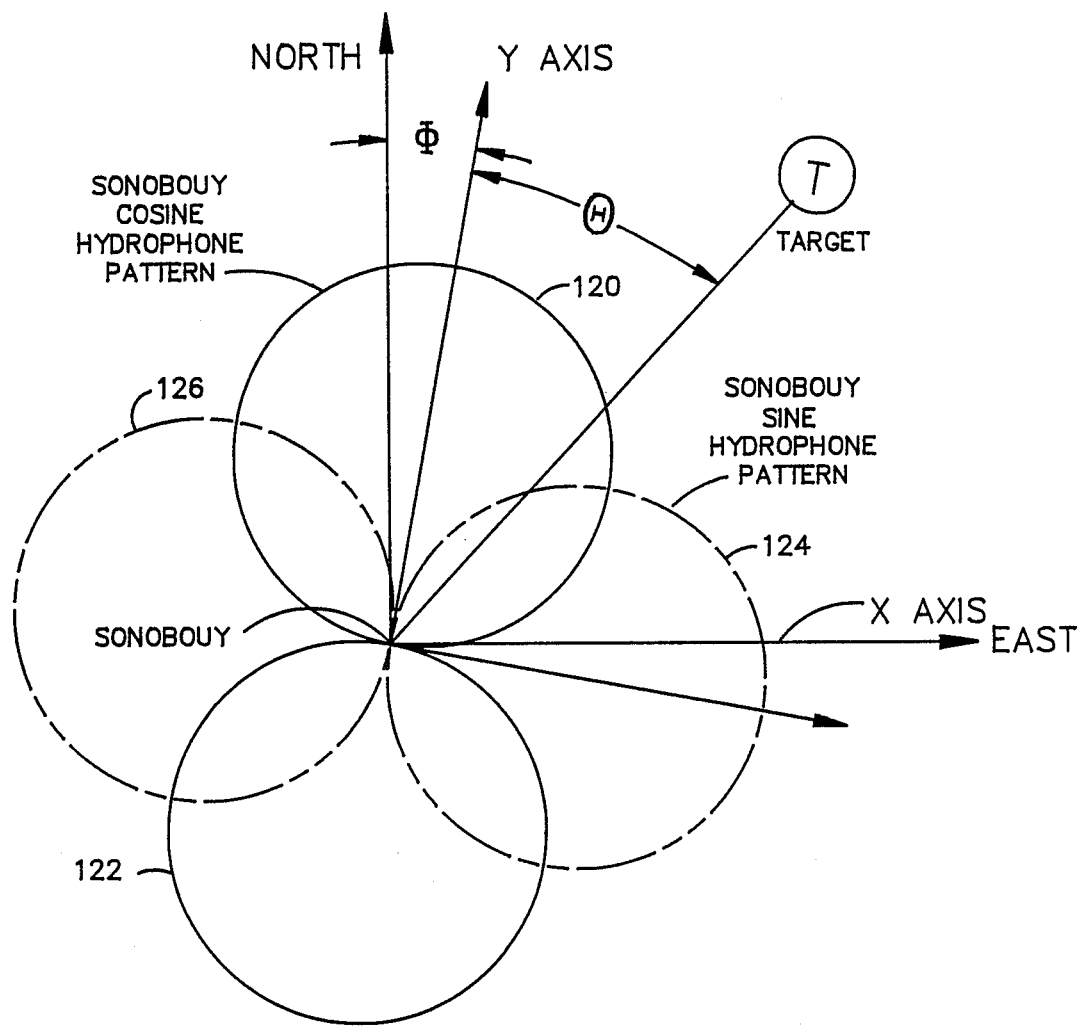
FIG. 1 depicts the relationship between the reference system of the sonobuoy and a magnetic north reference coordinate system.

FIG. 1 depicts the location of a sonobuoy with respects to the location of a target emitting an audio signal. The source of the audio signal is shown as a circle with an upper case T. The Y axis of the sonobuoy is a reference axis. A hydrophone on the Y axis has a dual lobe circular gain pattern 120, 122. A hydrophone on the X axis has a dual lobe gain pattern 124, 126. The amplitude of the audio signal received by the Y axis hydrophone is proportional to the amplitude of the received audio signal times the cosine of the angle between the sonobuoy Y axis and the radial to the target. A cosine signal is developed from this signal component. The amplitude of the audio signal received by the X axis hydrophone is proportional to the amplitude of the received audio signal times the sine of the angle between the sonobuoy X axis and the radial to the target. A sine signal is developed from this component. The Y and X axis represent the reference frame of the sonar buoy receiving the audio signal.

The sonobuoy also has an omni directional hydrophone. The output of the omni hydrophone is used to develop an omni signal. The sonobuoy also provides a frequency pilot signal and a phase pilot reference signal.

The sonobuoy transmits a sonobuoy composite signal containing an omni signal, a cosine modulated signal, a sine modulated signal, a frequency pilot signal and a phase pilot reference signal.

Figure 3:
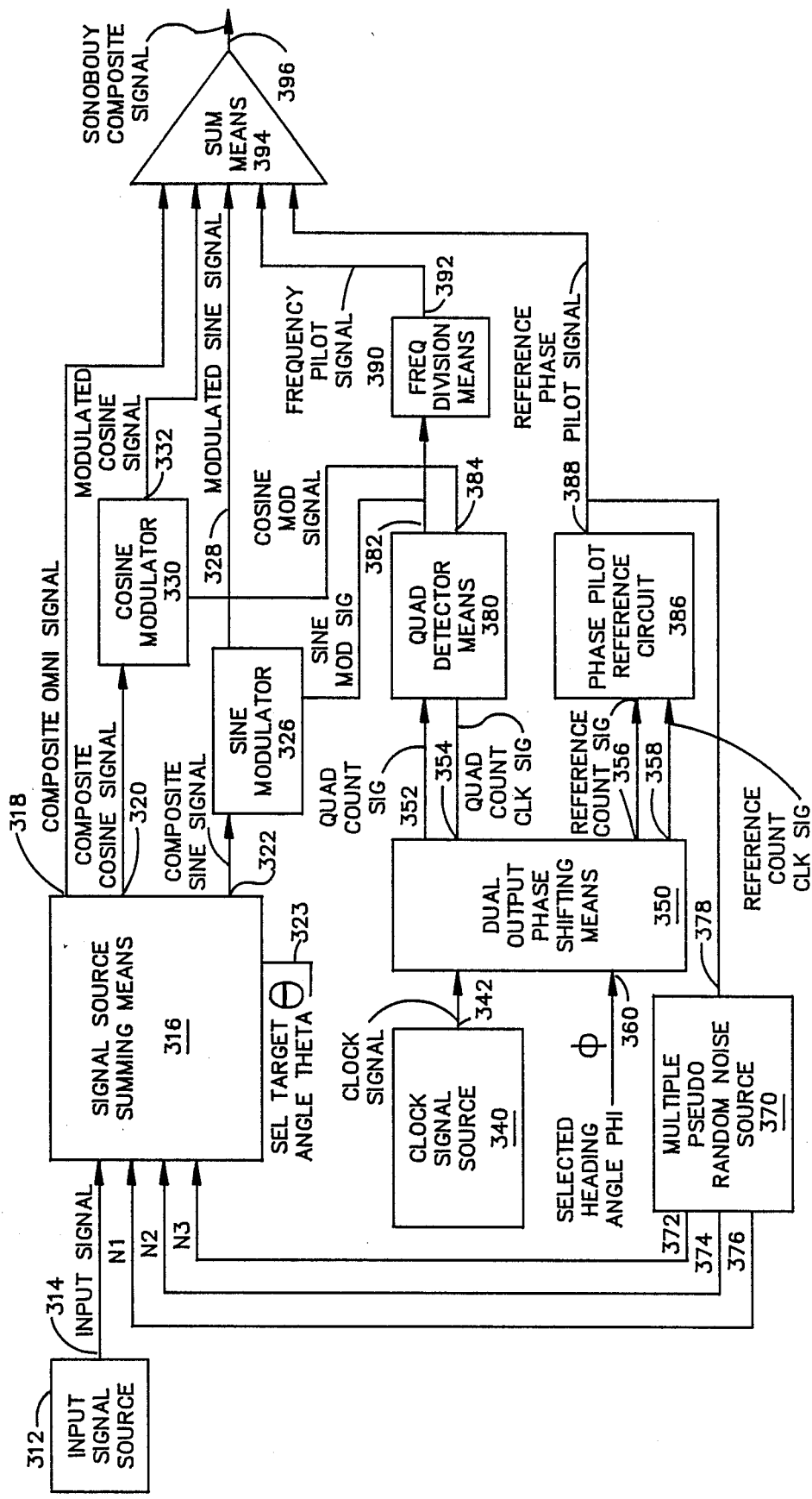
FIG. 3 is a block diagram of the DIFAR demultiplexer test circuit.

FIGS. 3 shows a DIFAR demultiplexer test circuit for generating the sonobuoy composite signal. The DIFAR demultiplexer test circuit is responsive to an input signal from a signal source 312. The signal source is characterized to permit an operator to control the amplitude and frequency of the input signal. A clock signal from a clock signal source 340 having a selectable predetermined frequency. The difar demultiplexer test circuit provides a sonobuoy composite output signal to the input of a difar demultiplexer circuit (not shown).

The demultiplexer test circuit of FIG. 3 has a signal source summing means 316 responsive to the input signal via signal line 314 and to first, second and third independent noise signals N1, N2 and N3 via signal lines 376, 374 and 372 respectively. The signal source summing means 316 is also responsive to a selected target angle theta via signal line 323 and alternatively by an operator by positioning a set of switches, such as those illustrated in further detail in FIG. 5 as SW2 and SW3.

The signal source summing means 316 adds the first independent noise signal N1 to the input signal via signal line 314 to provide a composite omni signal. The signal source summing means 316 adds the second noise signal N2 to a signal representing the product of the cosine of the selected target angle and the input signal to provide a composite cosine signal at output terminal 320. The signal source summing means 316 adds the third noise signal N3 to a signal representing the product of the sine of the selected target angle and the input signal to provide a composite sine signal at output terminal 322.

Block 350 on FIG. 3 represents a dual output phase shifting means responsive to the clock signal via signal line 342 and to a selected heading angle phi via signal line 360 for providing a quad count signal on signal line 352 and a quad count clock signal on signal line 354. The quad count clock signal has a frequency equal to an integer multiple, such as four (4) times the quad count signal. The dual output phase shifting means 350 also provides a reference count signal via signal line 356 and a reference count clock signal via signal line 358. The reference count clock signal has a frequency equal to an integer multiple, such as four (4) times of the reference count signal.

Figure 2:
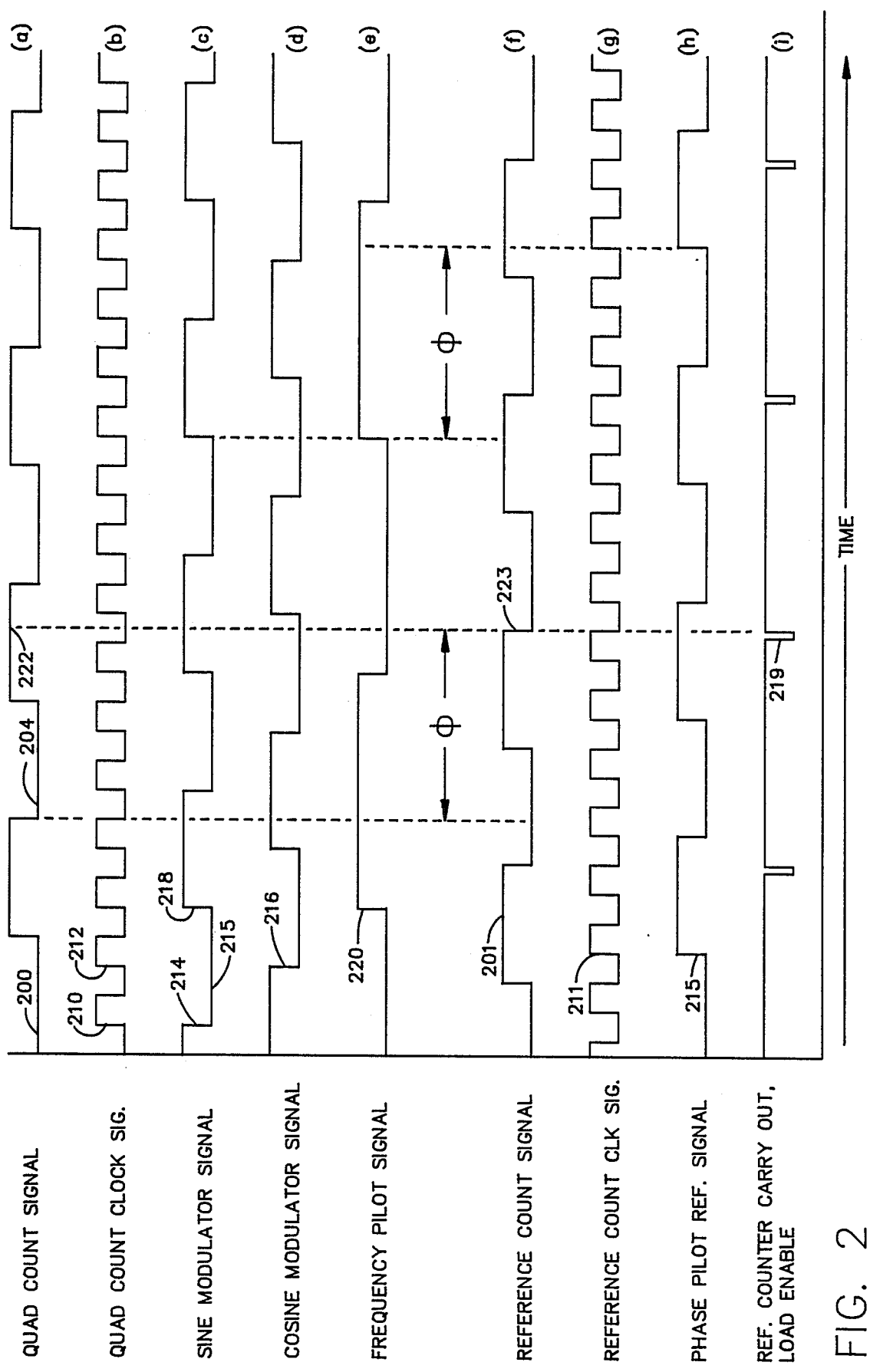
FIG. 2 is a timing diagram showing the phasing relationships between the phase pilot reference signal, waveform (h) and other in circuit waveforms.

Referring to FIG. 2, waveforms (a) and (b) represent the quad count signal and the quad count clock signal. Waveforms (f) and (g) represent the reference count signal and the reference count clock signal. The reference count signal is characterized to lag the quad count signal by a time interval proportional to the selected heading angle phi as shown between phantom reference lines 204 and 223.

Referring again to FIGS. 3 and 4, block 380 represents a quadrature detector circuit responsive to the quadrature count signal via signal line 352 and the quadrature count clock signal via signal line 354 for transferring the state of the quadrature count signal to a sine modulator signal in response to a quadrature count clock signal to provide the sine modulator signal on signal line 382. The quadrature detector circuit 380 also transfers the state of the sine modulator signal via signal line 382 to the cosine modulator signal on signal line 384 in response to the quadrature count clock signal to provide the cosine modulator signal 384. As shown on FIG. 2, the sine modulator signal, waveform (c) is characterized to lead the cosine modulator signal, waveform (d) by ninety degrees.

Figure 4:
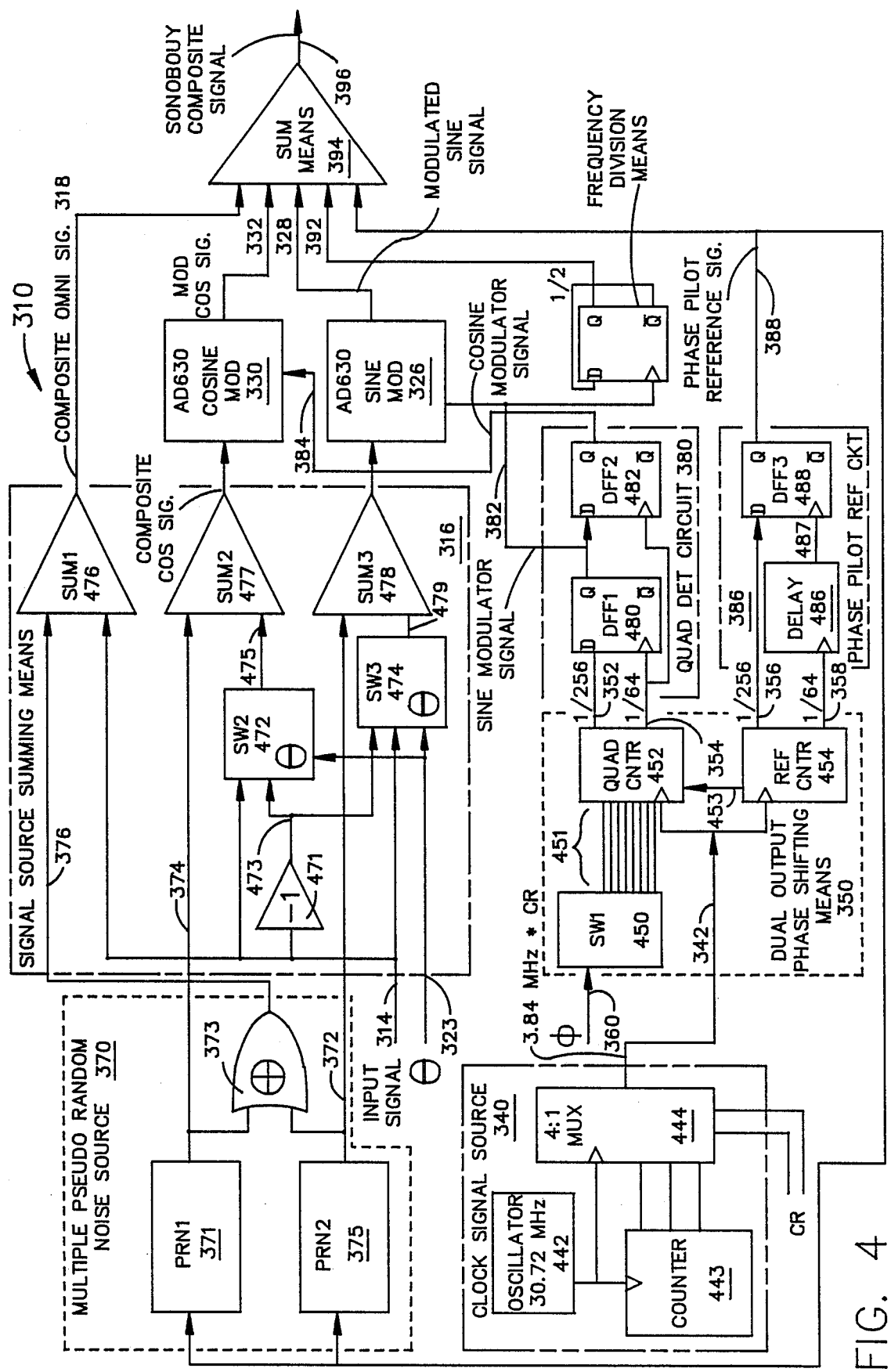
FIG. 4 is more detailed block diagram of the DIFAR demultiplexer test circuit.

Block 386 in FIG. 3 and 4 represents a phase pilot reference circuit responsive to the reference count signal via signal line 356 and the reference count clock signal via signal line 358 for transferring the state of the reference count signal via signal line 356 to a phase pilot reference signal as an output on signal line 388 in response to a reference count clock signal to provide the phase pilot reference signal.

Block 330 represents a cosine modulator responsive to the composite cosine signal via signal line 320 and to a cosine modulator signal via signal line 384 for providing a modulated cosine signal on signal line 332.

Block 326 represents a sine modulator responsive to the composite sine signal via signal line 322 and to a sine modulator signal via signal line 382 for providing a modulated sine signal on signal line 328.

Block 390 represents a frequency division means responsive to the sine modulator signal on signal line 382 for providing a frequency pilot signal on signal line 392 having a frequency equal to one half the frequency of the sine modulator signal on signal line 382.

Block 370 represents a multiple pseudo random noise source for providing first, second and third independent noise signals N1, N2 and N2 respectively on signal lines 376, 374 and 372 respectively.

Block 394 represents a sum means responsive to the composite omni signal on signal line 318, to the modulated cosine signal on signal line 332, to the modulated sine signal on 328, to the frequency pilot signal on signal line 392 and to the phase pilot reference signal on signal line 388 for providing a sonobuoy composite signal on signal on signal line 396. The sonobuoy composite signal output from sum means 394 represents the sum of the composite omni signal, the modulated cosine signal, the modulated sine signal, the frequency pilot signal and the reference phase pilot signal.

Referring to FIG. 4, the signal source summing means 316 has an inverting amplifier 471 responsive to said input signal via signal line 314 for providing an inverted input signal to first and second scaling means 472 and 474.

The first scaling means 472 is responsive to the input signal via signal line 314 and to the inverted input signal via signal line 473 and to the selected target angle represented by a signal input line 323 for providing a cosine scaled output signal on signal line 475. The selected target angle input is made by an operator positioning one eight (8) switches to couple either the input signal or the inverted input or neither of these signals through a switch and one or more scaling resistors as shown in more detail by SW2 in FIG. 5c.

The second scaling means 474 is responsive to the input signal via signal line 314 and to the inverted input signal via signal line 473 and to the selected target angle via signal represented by a signal input line 323 for providing a sine scaled output signal on signal line 479.

Amplifiers 476, 477 and 478 represent first, second and third summing amplifiers. Each amplifier has a first and second input terminal and an output terminal. The first amplifier first input terminal is coupled to the first independent noise signal N1. The first amplifier second input terminal is coupled to the input signal via signal line 314.

The second amplifier first input terminal is coupled to the second independent noise signal N2. The second amplifier second input terminal is coupled to the scaled cosine output signal via signal line 475.

The third amplifier first input terminal is coupled to the third independent noise signal N3. The third amplifier second input terminal is coupled to the scaled sine output signal via signal line 479.

Figure 5A:
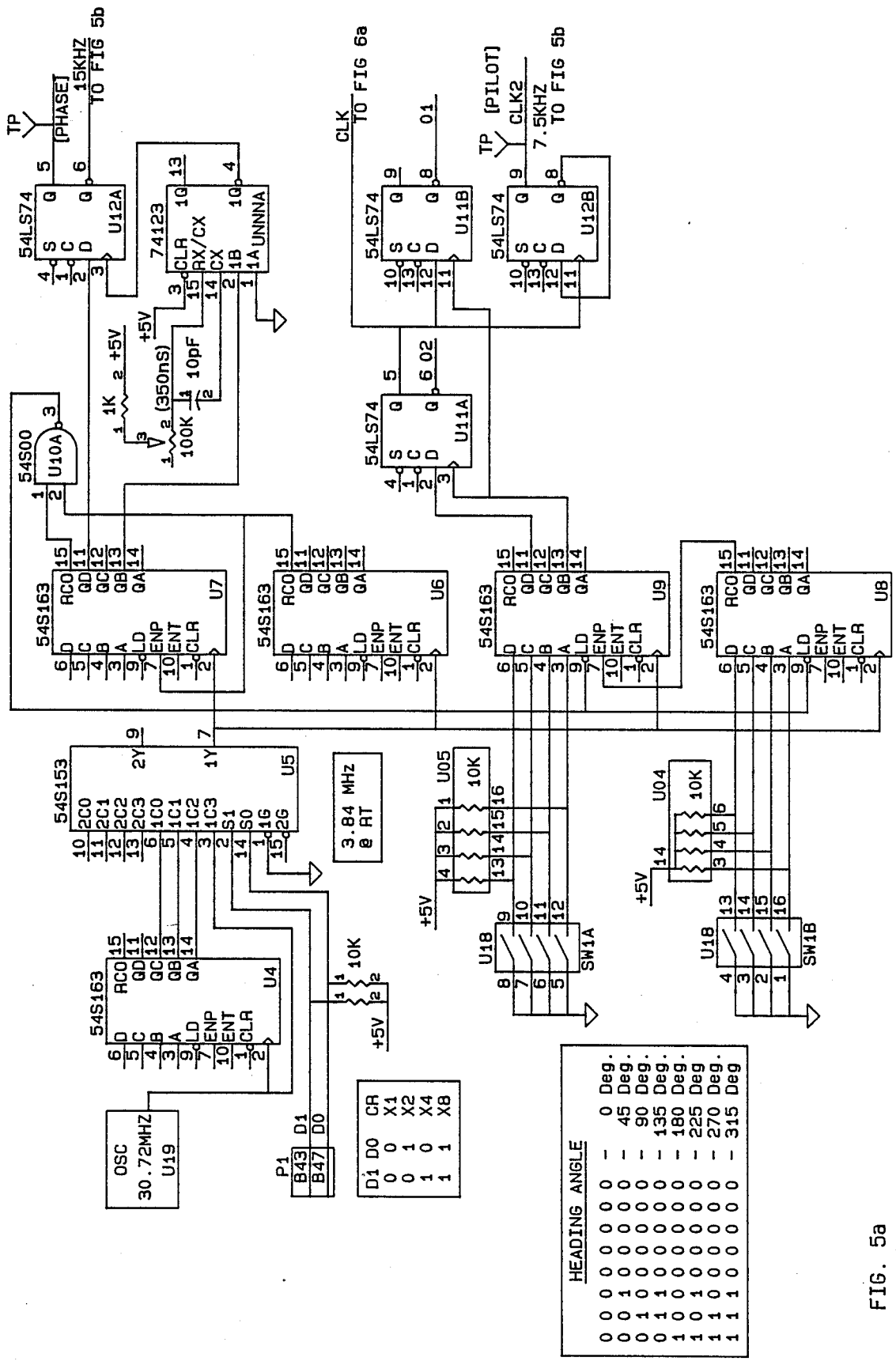
FIGS. 5a, 5b, and 5c are detailed schematic diagrams of the difar demultiplexer test circuit showing all electrical circuit features without the circuitry for the noise source.

Block 350 in FIG. 4 shows an embodiment of the dual output phase shifting means. Block 450 represents a counter loading means having a plurality of manually selected switches. SW1A and SW1B in combination with pull-up resistors U05 and U04 on FIG. 5a represent a particular embodiment of the counter loading means. An operator positions the eight switches to obtain one of 256 possible combinations to characterize the selected heading angle phi to establish the digital representation of the selected heading angle phi on quad counter input bus 451.

Block 452 is a quad counter having a clock input via signal line 342. The quad counter receives a load enable input via signal line 453 and a signal representing the angle phi via the quad counter input bus 451. Referring to FIG. 2 and FIG. 4, the quad counter 452 is responsive to the reference counter carry out signal shown as waveform (i) at its load enable input. The load enable signal of waveform (i) at reference point 219 transfers the input bus data into the quad counter at reference point 222 on waveform (a).

The quad counter 452 responds to the reference counter carry out signal to load the digital representation of the selected heading angle phi into a binary counter having at least a first and second binary counter output terminal. The binary counter is typically a 54S163 such as U8 and U9 in FIG. 5a. Signal line 354 represents a first binary output terminal providing the quad count clock signal. Signal line 352 represents a second binary terminal providing the quad count signal. The quad count clock signal has a frequency equal to four (4) times the frequency of the quad count signal.

The relationship between the quad count signal and the quad count clock signal are show in waveforms (a) and (b) of FIG. 2.

Referring to FIG. 4, block 454 represents a reference counter. The reference counter receives and responds to a clock signal via signal line 342. The reference counter 454 has a binary counter having a modulo or count limit equivalent to the modulo of the quad counter binary counter 452. The reference counter is typically two binary counters such as 54S163 devices configured as shown in FIG. 5a as U7 and U6.

The reference counter 454 provides a reference count signal via signal line 356, a reference count clock signal via signal line 358 and the reference counter carry out signal on signal line 453. As shown in FIG. 5a, the equivalent binary counter U7 has at least a first and second binary counter output terminal such as U7-11 and U7-13 and uses a two input NAND gate U10A to provide reference a counter carry out signal at a terminal such as U10-3.

The first binary output terminal provides the reference count clock signal via signal line 358. The second binary terminal provides the reference count signal via signal line 356. The reference count clock signal has a frequency equal to four (4) times the frequency of the reference count signal as shown in FIG. 2 by waveforms (g) and (f).

The reference counter carry out signal terminal U10-3 provides the reference counter carry out signal at the modulo limit count of 255 preceding reset of the counter 454 to zero. The reference counter 454 and the quad counter 452 are characterized to advance one count in response to each succesive clock signal on signal line 342.

Referring to FIG. 4, phantom block 380 represents the quadrature detector circuit. Blocks 480 and 482 are D-Type Flip-flops such as 54LS74 devices. These devices represent a first and second flip-flop in the quadrature detector circuit. The first and second flip-flops are shown with greater particularity on FIG. 5 as U11A and U11B.

Referring to FIG. 4, the first flip-flop 480 has an input coupled to the quadrature count signal via signal line 352 and a clock input coupled to the quadrature count clock signal via signal line 354. The first flip is responsive to each clock signal for copying and storing the last state of the quadrature count signal to provide the sine modulator signal on signal line 382. Referring to FIG. 2, the leading edge 210 of the quad count clock signal is shown transferring the low state of the quad count signal 200 to the sine modulator signal at transition 214.

Referring to FIG. 4, the second flip-flop 482 has an input coupled to the sine modulator signal via signal line 382 and a clock input coupled to the quadrature count clock signal via signal line 354. The second flip-flop is responsive to each clock signal for copying and storing the last state of the sine modulator signal on signal line 382 to provide the cosine modulator signal on signal line 384. Referring to FIG. 2, the leading edge 212 of the quad count clock signal is shown transferring the low state of the sine modulator signal 215 to the cosine modulator signal at transition 216.

Figure 5B:
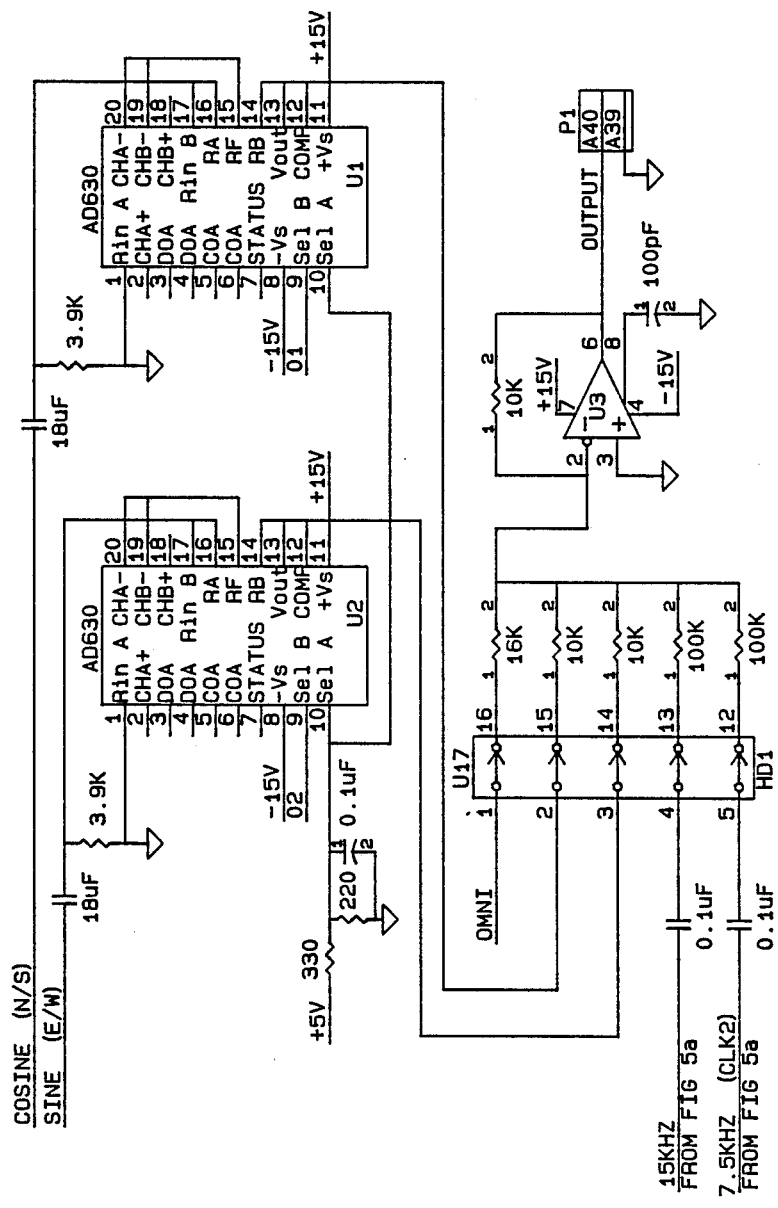
Figure 5C:
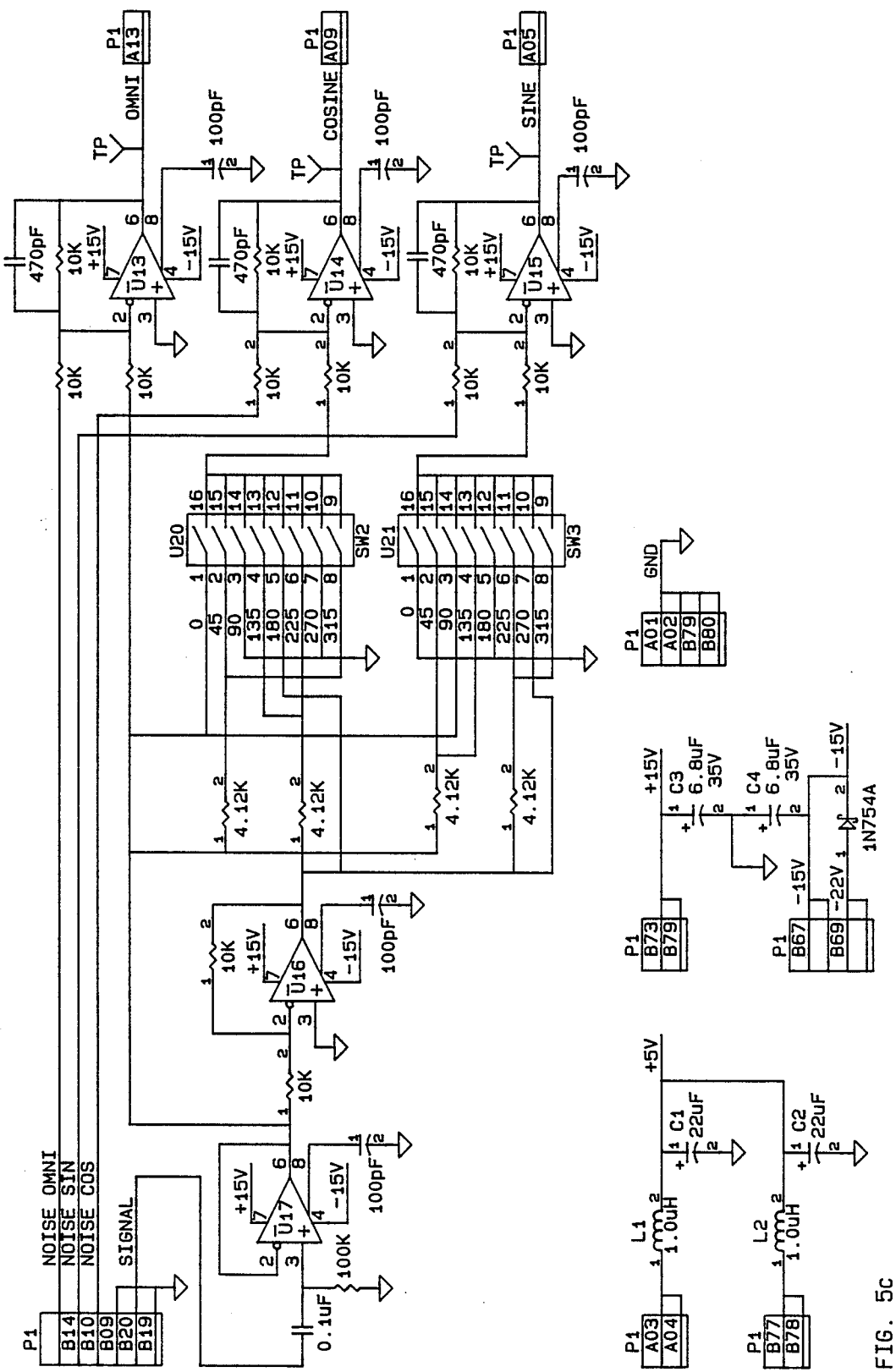

Referring to FIG. 4, block 330 represents the cosine modulator, typically a Analog Devices AD630 shown as U1 in FIG. 5b. The function of the cosine modulator is to copy the composite cosine signal through a switch internal to the modulator device to its output in response to the high state of the cosine modulator signal. The modulator device provides the inverted value of the composite cosine signal at its output in response to the low state of the cosine modulator signal. The output signal from the cosine modulator is referred to as the modulated cosine signal on signal line 332.

Referring to FIG. 4, block 326 represents the sine modulator, also typically an Analog Devices AD630 and shown as U2 in FIG. 5b. The function of the sine modulator is to copy the composite sine signal through a switch internal to the modulator device to its output in response to the high state of the sine modulator signal. The modulator device provides the inverted value of the composite sine signal at its output in response to the low state of the sine modulator signal. The output signal from the sine modulator is referred to as the modulated sine signal on signal line 328.

Figure 6A:
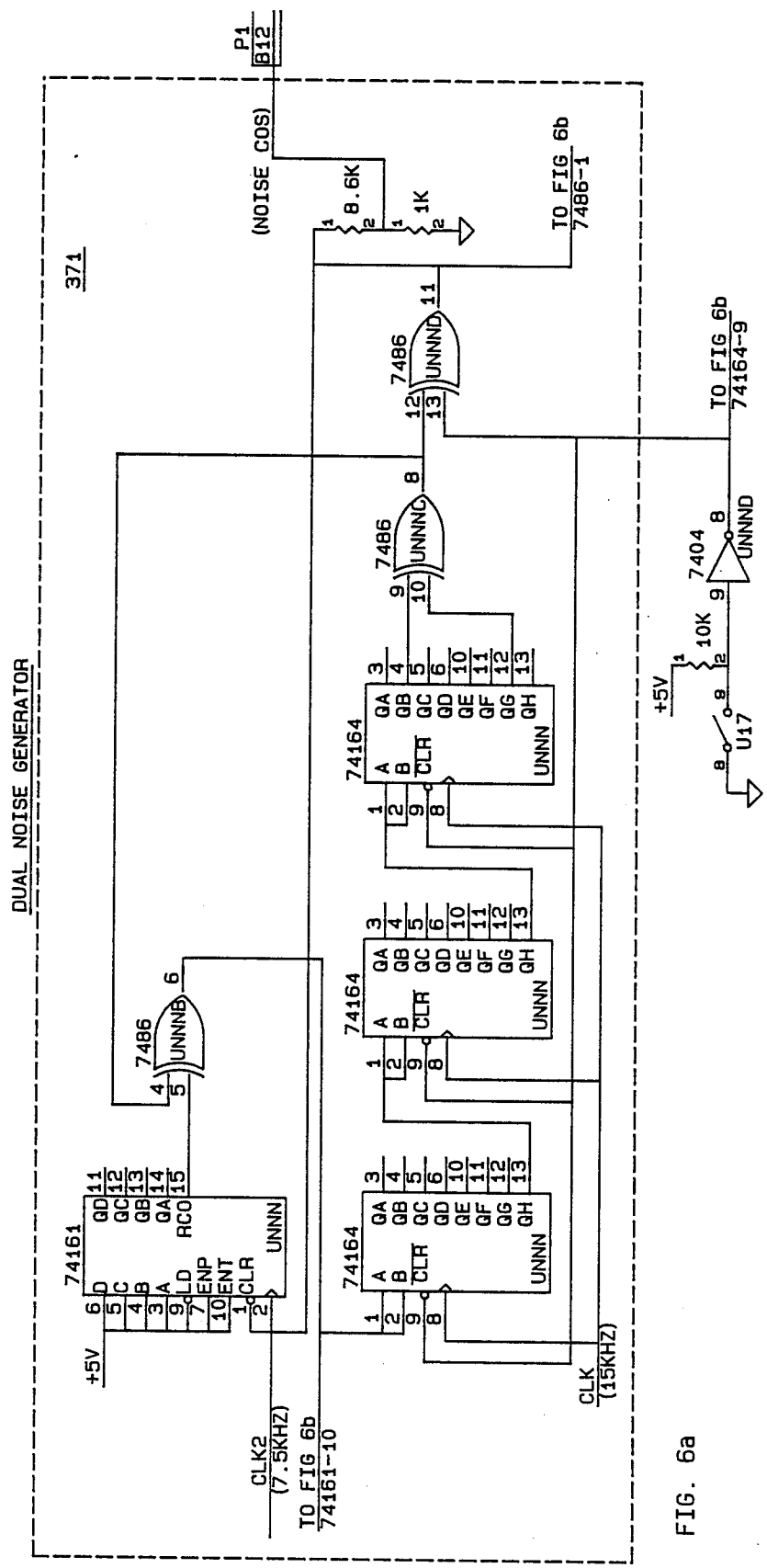
FIGS. 6a and 6b are schematics of the noise source.
Figure 6B:
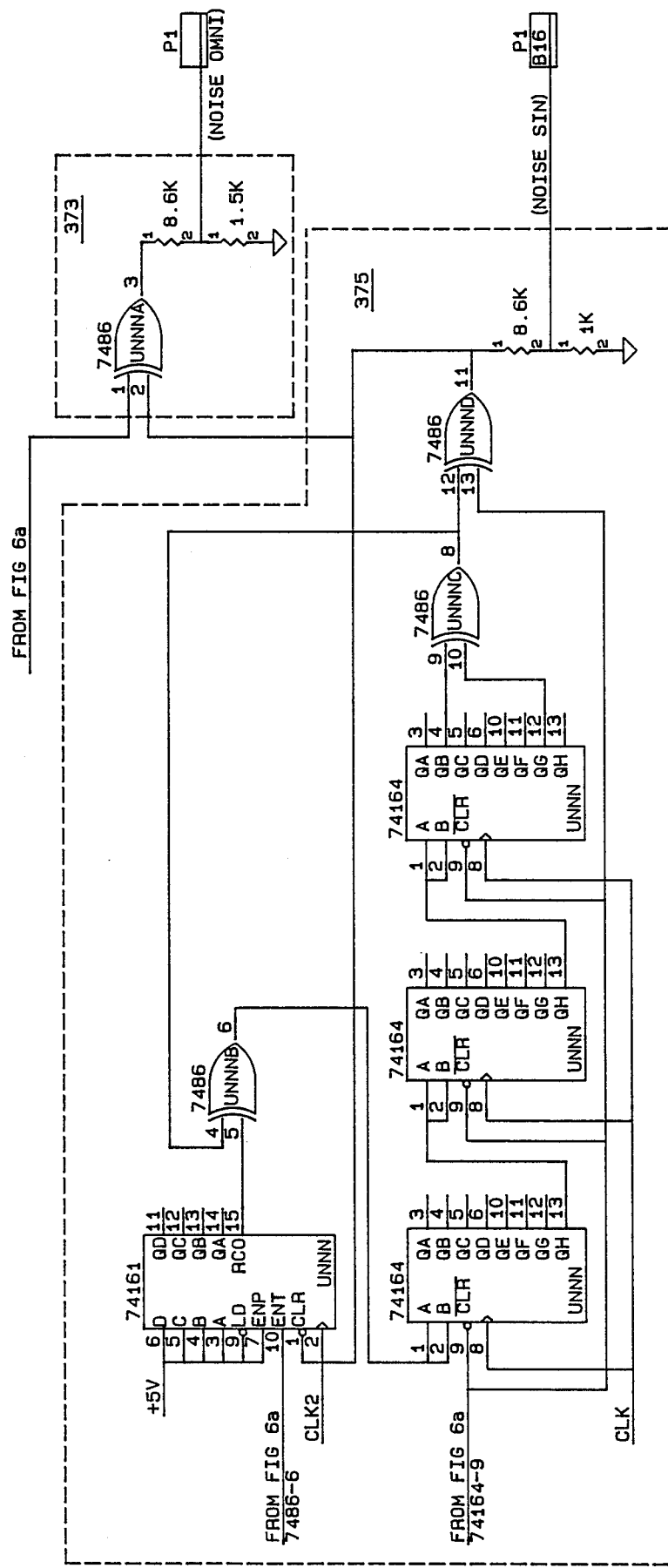

Referring to FIG. 4, block 370 represents the multiple pseudo random noise source. Block 471 and 472 represent twenty-three bit shift registers typically formed from 74164 8-bit shift registers. FIGS. 6a and 6b show a circuit arrangement for making a pseudo random noise generator suitable for this application. Phantom block 371 in FIG. 6a represents the circuit within block 371 of FIG. 4 and phantom block 375 in FIG. 6b represents the circuit within block 375 of FIG. 4. Other alternative embodiments are possible. The circuit of FIG. 6 has the added feature of generating a third random signal noise source via exclusive or gate 373. The three noise sources must be uncorrelated.

Each respective digital pseudo random noise signal source has a clock input coupled to receive the phase pilot reference signal via signal line 388 and a respective output. The first digital pseudo random noise signal source output provides the second independent noise signal into the cosine summing means via signal line 374. The second digital pseudo random noise signal source output providing the third independent noise signal into the sine summing means via signal line 372.

Exclusive OR gate 373 has a first input coupled to the second independent noise signal, at signal line 374 and a second input coupled to the third independent noise signal at signal line 372 to provide the first independent noise signal on signal line 376.

Referring to FIG. 4, the sum means 394 is typically an inverting summing amplifier such as U3 on FIG. 5b. The summing amplifier has a first input coupled to receive the composite omni signal via signal line 318, a second input coupled to receive the modulated cosine signal via signal line 332, a third input coupled to receive the modulated sine signal via signal line 328, a fourth input coupled to receive the frequency pilot signal via signal line 392 and a fifth input coupled to receive the phase pilot reference signal on signal line 388 to provide the inverted linear sum of the composite omni signal, the modulated cosine signal, the modulated sine signal, the frequency pilot signal and the reference phase pilot signal to represent the sonobuoy composite signal. The inputs to the summing amplifier are scaled with input scaling resistors to provide the required signal contributions.

Referring to FIG. 4, the phase pilot reference circuit within phantom block 386 has a flip-flop 488 that has an input D coupled to the reference count signal on signal 356 and a clock input coupled to the reference count clock signal via signal line 358. The flip-flop is responsive to each clock signal for copying and storing the last state of the reference count signal to provide the phase pilot reference signal. Referring to FIG. 2, the leading edge at 211 of the reference count clock signal, waveform (g) is shown transferring the high state of the reference count signal 201 to the phase pilot reference signal at transition 215.

Referring to FIG. 4, block 486 represents a delay means responsive to the reference count clock signal on signal line 358 for providing a delayed reference count clock signal on signal line 487. FIG. 5a shows an embodiment of the delay driven by an output from U7 using a 74123 as a single shot multi-vibrator. An adjustable resistor is used to set the delay to compensate for the time required to pass signal information through modulators 330 and 326.

The invention DIFAR demultiplexer test circuit receives a clock signal from a clock signal source responsive to a two bit compression ratio signal CR. The compression ratio signal is a logic signal provided to the test circuit to adapt the DIFAR demultiplexer test circuit to simulate signals received from a sonobuoy at four different clock rates as a sonobuoy composite output signal. FIG. 4 shows oscillator 442 providing a master clock signal at 30.72 MHz to counter 443 and to a 4:1 MUX 444. MUX 444 responds to the CR signal to either pass the 30.72 clock straight through to signal line 342 or to select a one of three divided down outputs from counter 443.

Although the invention method has been disclosed and illustrated in detail, it is to be clearly understood that the same is by way of illustration as an example only and is not to be taken by way of limitation. The spirit and scope of this invention is to be limited only by the terms of the appended claims.

I claim:

1. A demultiplexer test circuit responsive to a input signal from a signal source, said signal source being characterized to permit an operator to control the amplitude and frequency of said input signal, and to a clock signal from a clock signal source having a selectable predetermined frequency for providing a composite output signal to the input of a difar demultiplexer circuit, said demultiplexer test circuit comprising:

a multiple pseudo random noise source for providing first, second and third independent noise signals;

a signal source summing means responsive to said input signal and to first, second and third independent noise signals and to a selected target angle theta for adding said first independent noise signal to said input signal to provide a composite omni signal and for adding said second noise signal to the product of the cosine of the selected target angle and the input signal to provide a composite cosine signal, and for adding said third noise signal to the product of the sine of the selected target angle and the input signal to provide a composite sine signal;

a dual output phase shifting means responsive to said clock signal and to a selected heading angle phi for providing a quad count signal and a quad count clock signal, said quad count clock signal having a frequency equal to an integer multiple of said quad count signal, and for providing a reference count signal and a reference count clock signal, said reference count clock signal having a frequency equal to an integer multiple of said reference count signal, said reference count signal being characterized to lag said quad count signal by a time interval proportional to said selected heading angle phi;

a quadrature detector circuit responsive to said quadrature count signal and said quadrature count clock signal for transferring the state of said quadrature count signal to a sine modulator signal in response to a quadrature count clock signal to provide said sine modulator signal and for transferring the state of said sine modulator signal to said cosine modulator signal in response to said quadrature count clock signal to provide said cosine modulator signal, the sine modulator signal being characterized to lead the cosine modulator signal by ninety degrees;

a phase pilot reference circuit responsive to said reference count signal and said reference count clock signal for transferring the state of said reference count signal to a phase pilot reference signal in response to a reference count clock signal to provide said a phase pilot reference signal;

a cosine modulator responsive to said composite cosine signal and to a cosine modulator signal for providing a modulated cosine signal;

a sine modulator responsive to said composite sine signal and to a sine modulator signal for providing a modulated sine signal;

a frequency division means responsive to said sine modulator signal for providing a frequency pilot signal having a frequency equal to one half the frequency of said sine modulator signal;

a sum means responsive to said composite omni signal, to said modulated cosine signal, to said modulated sine signal, to said frequency pilot signal and to said phase pilot reference signal for providing a sonobuoy composite signal representing the sum of said composite omni signal, said modulated cosine signal, said modulated sine signal, said frequency pilot signal and said reference phase pilot signal; whereby, said invention DIFAR TEST CIRCUIT provides a sonobuoy composite signal having a omni signal representing an omni-directional hydrophone signal, an audio signal having cosine and sine components, each component having an amplitude proportional to the amplitude of the audio signal times the respective cosine and sine of a selected target angle theta representing the angle between the source of the audio signal and a frame reference referenced to the reference system of said sonar buoy, the cosine component being modulated by a cosine modulator signal and the sine component being modulated by a sine modulator signal, said sine modulator signal being characterized as leading the cosine modulator signal by 90 degrees.

2. A demultiplexer test circuit responsive to a input signal from a signal source and to a clock signal from a clock signal source having a selectable predetermined frequency for providing a composite output signal to the input of a difar demultiplexer circuit, said demultiplexer test circuit comprising:

a multiple pseudo random noise source for providing first, second and third independent noise signals;

a signal source summing means responsive to said input signal and to first, second and third independent noise signals and to a selected target angle theta for adding said first independent noise signal to said input signal to provide a composite omni signal and for adding said second noise signal to the product of the cosine of the selected target angle and the input signal to provide a composite cosine signal, and for adding said third noise signal to the product of the sine of the selected target angle and the input signal to provide a composite sine signal;

a dual output phase shifting means responsive to said clock signal and to a selected heading angle phi for providing a sine modulator signal and a cosine modulator signal and a phase pilot reference signal; each signal having a common frequency at a submultiple frequency of said clock signal, the sine modulator signal being characterized to lead the cosine modulator signal by ninety degrees;

a cosine modulator responsive to said composite cosine signal and to said cosine modulator signal for providing a modulated cosine signal;

a sine modulator responsive to said composite sine signal and to a sine modulator signal for providing a modulated sine signal;

a frequency division means responsive to said sine modulator signal for providing a frequency pilot signal having a frequency equal to one half the frequency of said sine modulator signal;

a sum means responsive to said composite omni signal, to said modulated cosine signal, to said modulated sine signal, to said frequency pilot signal and to said phase pilot reference signal for providing a sonobuoy composite signal representing the sum of said composite omni signal, said modulated cosine signal, said modulated sine signal, said frequency pilot signal and said reference phase pilot signal.

3. The demultiplexer test circuit of claim 2 wherein said dual output phase shifting means further comprises:

a counter loading means having a plurality of manually selected switches positioned to characterize the selected heading angle phi for establishing the digital representation of said selected heading angle phi on a quad counter input bus;

a quad counter having a clock input response to said clock signal, a load enable input responsive to a reference counter carry out signal and an quad counter input bus coupled to receive said digital representation of said selected heading angle phi for providing a quad count signal and a quad count clock signal, said quad counter being responsive to said reference counter carry out signal for loading said digital representation of said selected heading angle phi into a binary counter having at least a first and second binary counter output terminal, said first binary output terminal providing said quad count clock signal, and said second binary terminal providing said quad count signal, said quad count clock signal having a frequency equal to four (4) times the frequency of said quad count signal;

a reference counter having a clock input responsive to said clock signal and having a binary counter having a modulo equivalent to the modulo of said quad counter binary counter, for providing a reference count signal;

a quadrature detector circuit responsive to said quadrature count signal and said quadrature count clock signal for transferring the state of said quadrature count signal to form a sine modulator signal in response to a quadrature count clock signal and for transferring the state of said sine modulator signal to said cosine modulator signal in response to a successive quadrature count clock signal to provide said cosine modulator signal, the sine modulator signal being characterized to lead the cosine modulator signal by ninety degrees; and a phase pilot reference circuit responsive to said reference count signal and said reference count clock signal for transferring the state of said reference count signal to a phase pilot reference signal in response to a reference count clock signal to provide said a phase pilot reference signal.

4. The demultiplexer test circuit of claim 2 wherein said signal source summing means further comprises:

an inverting amplifier responsive to said input signal for providing an inverted input signal;

a first scaling means responsive to said input signal and to said inverted input signal and to said selected target angle for providing a cosine scaled output signal;

a second scaling means responsive to said input signal and to said inverted input signal and to said selected target angle for providing a sine scaled output signal;

first, second and third summing amplifiers, each amplifier having a first and second input terminal and an output terminal, said first amplifier first input terminal being coupled to first independent noise signal and said first amplifier second input terminal being coupled to said input signal;

said second amplifier first input terminal being coupled to second independent noise signal and said second amplifier second input terminal being coupled to said scaled cosine output signal;

said third amplifier first input terminal being coupled to third independent noise signal and said third amplifier second input terminal being coupled to said scaled sine output signal.

5. The demultiplexer test circuit of claim 2 wherein said dual output phase shifting means further comprises:

a counter loading means having a plurality of manually selected switches positioned to characterize the selected heading angle phi for establishing the digital representation of said selected heading angle phi on a quad counter input bus;

a quad counter having a clock input response to said clock signal, a load enable input responsive to a reference counter carry out signal and an quad counter input bus coupled to receive said digital representation of said selected heading angle phi for providing a quad count signal and a quad count clock signal, said quad counter being responsive to said reference counter carry out signal for loading said digital representation of said selected heading angle phi into a binary counter having at least a first and second binary counter output terminal, said first binary output terminal providing said quad count clock signal, and said second binary terminal providing said quad count signal, said quad count clock signal having a frequency equal to four (4) times the frequency of said quad count signal;

a reference counter having a clock input response to said clock signal and having a binary counter having a modulo equivalent to the modulo of said quad counter binary counter, for providing a reference count signal, a reference count clock signal and said reference counter carry out signal, said binary counter having at least a first and second binary counter output terminal and a reference counter carry out signal terminal, said first binary output terminal providing said reference count clock signal, and said second binary terminal providing said reference count signal, said reference count clock signal having a frequency equal to four (4) times the frequency of said reference count signal;

said reference counter carry out signal terminal providing said reference counter carry out signal at the modulo limit count preceding reset to zero, said reference counter and said quad counter being characterized to advance one count in response to each successive clock signal.

6. The demultiplexer test circuit of claim 2 wherein said quadrature detector circuit further comprises:

a first and second flip-flop, said first flip-flop having an input coupled to said quadrature count signal and a clock input coupled to said quadrature count clock signal, said first flip being responsive to each clock signal for copying and storing the last state of the quadrature count signal to provide said sine modulator signal;

said second flip-flop having an input coupled to said sine modulator signal and a clock input coupled to said quadrature count clock signal, said second flip-flop being responsive to each clock signal for copying and storing the last state of the sine modulator signal to provide said cosine modulator signal.

7. The demultiplexer test circuit of claim 2 wherein said cosine modulator is further characterized to:

copy the non-inverted composite cosine signal in response to the high state of the cosine modulator signal and to provide the inverted value of the composite cosine signal in response to the low state of the cosine modulator signal as the modulated cosine signal.

8. The demultiplexer test circuit of claim 2 wherein said sine modulator is further characterized to:

copy the composite sine signal in response to the high state of the sine modulator signal and to provide the inverted value of the composite sine signal in response to the low state of the sine modulator signal as the modulated sine signal.

9. The demultiplexer test circuit of claim 2 wherein said multiple pseudo random noise source further comprises:

a first and second digital pseudo random noise signal source, each respective digital pseudo random noise signal source having a clock input coupled to receive said phase pilot reference signal and a respective output, said first digital pseudo random noise signal source output providing said second independent noise signal, said second digital pseudo random noise signal source output providing said third independent noise signal;

an exclusive OR gate having a first input coupled to said second independent noise signal and a second input coupled to said third independent noise signal to provide said first independent noise signal.

10. The demultiplexer test circuit of claim 2 wherein said phase pilot reference circuit further comprises:

a flip-flop having an input coupled to said reference count signal and a clock input coupled to said reference count clock signal, said flip-flop being responsive to each clock signal for copying and storing the last state of the reference count signal to provide said phase pilot reference signal.

11. The demultiplexer test circuit of claim 2 further comprising:

a clock signal source for providing a master clock signal;

a counter responsive to said master clock signal for providing at least one alternate clock signal output, each respective alternate clock signal output from said counter having a different submultiple frequency of said master clock signal;

a multiplexer responsive to a compression ratio signal, to said master clock signal, and to each alternate clock signal for selecting from the group composed of said master clock signal and said alternate clock signals one clock signal and for outputting said selected clock signal to said dual output phase shifting means.

12. The demultiplexer test circuit of claim 2 wherein said sum means further comprises:

an inverting summing amplifier having a first input coupled to received said composite omni signal;

a second input coupled to receive said modulated cosine signal;

a third input coupled to receive said modulated sine signal;

a fourth input coupled to receive said frequency pilot signal; and a fifth input coupled to receive said phase pilot reference signal to provide the linear sum of said compoisite omni signal, said modulated cosine signal, said modulated sine signal, said frequency pilot signal and said reference phase pilot signal to represent said sonobuoy composite signal.

13. The demultiplexer test circuit of claim 12 wherein said phase pilot reference circuit further comprises:

a delay means responsive to said reference count clock signal for providing a delayed reference count clock signal;

flip-flop having an input coupled to said reference count signal and a clock input coupled to said delayed reference count clock signal, said flip-flop being responsive to each clock signal for copying and storing the last state of the reference count signal to provide said phase pilot reference signal.

* * * * *